United States Patent [19]
Berger et al.

[11] Patent Number: 5,858,140
[45] Date of Patent: Jan. 12, 1999

[54] NONWOVEN SURFACE FINISHING ARTICLES REINFORCED WITH A POLYMER BACKING LAYER AND METHOD OF MAKING SAME

[75] Inventors: Jeffrey L. Berger; Gary M. Fariss, both of St. Paul, Minn.

[73] Assignee: Minnesota Mining and Manufacturing Company, St. Paul, Minn.

[21] Appl. No.: 870,847

[22] Filed: Jun. 6, 1997

Related U.S. Application Data

[60] Continuation of Ser. No. 457,108, Jun. 1, 1995, abandoned, which is a division of Ser. No. 279,065, Jul. 22, 1994, Pat. No. 5,482,756.

[51] Int. Cl.⁶ .................. B32B 5/06; B32B 5/24
[52] U.S. Cl. ................... 156/62.2; 156/244.27; 156/309.6; 51/295; 51/297; 51/298; 451/539
[58] Field of Search .................. 156/62.2, 244.11, 156/244.27, 278, 279, 309.6, 309.9; 51/295, 297, 298, 400; 451/499, 534, 539; 15/230.12; 162/358.4, 901

[56] References Cited

U.S. PATENT DOCUMENTS

| | | |
|---|---|---|
| 1,519,577 | 12/1924 | Easton, Jr. . |
| 2,059,132 | 10/1936 | McDermott . |
| 2,308,405 | 1/1943 | Tully . |
| 2,958,593 | 11/1960 | Hoover et al. . |
| 3,075,222 | 1/1963 | Miller . |
| 3,080,688 | 3/1963 | Politzer . |
| 3,112,584 | 12/1963 | Cameron . |
| 3,280,517 | 10/1966 | Copeland . |
| 3,307,990 | 3/1967 | Homier et al. . |
| 3,324,609 | 6/1967 | Stein . |
| 3,342,533 | 9/1967 | Engel et al. . |
| 3,476,626 | 11/1969 | Charlton, Jr. . |
| 3,532,588 | 10/1970 | Newman . |
| 3,562,968 | 2/1971 | Johnson et al. . |
| 3,688,453 | 9/1972 | Legacy et al. . |
| 3,862,522 | 1/1975 | Mednick . |
| 3,937,861 | 2/1976 | Zuckerman et al. . |
| 3,956,560 | 5/1976 | Smith, II . |
| 3,976,525 | 8/1976 | Mednick . |
| 4,331,453 | 5/1982 | Dau et al. . |
| 4,609,581 | 9/1986 | Ott . |
| 5,171,628 | 12/1992 | Arvedson et al. . |
| 5,171,678 | 12/1992 | Arvedson et al. . |
| 5,238,998 | 8/1993 | Fuller et al. . |
| 5,278,020 | 1/1994 | Gruskhin et al. . |

FOREIGN PATENT DOCUMENTS

| | | |
|---|---|---|
| 1 562 843 | 3/1969 | France . |
| 1562843 | 3/1969 | France . |
| 2 353 690 | 5/1975 | Germany . |

OTHER PUBLICATIONS

Principles of Polymer Systems, 2nd Ed., Ferdinand Rodriguez, McGraw Hill, pp. 532–545 (1982).

*Primary Examiner*—Michael W. Ball
*Assistant Examiner*—Sam Chuan Yao
*Attorney, Agent, or Firm*—Gregory J. Feulner

[57] ABSTRACT

Abrasive and polishing belts and discs suitable for offhand and automated article finishing comprising a lofty, nonwoven abrasive web optionally needled to a woven fabric and a polymeric layer coated on the woven fabric opposite the nonwoven layer or if no woven fabric, coated on the nonwoven layer.

10 Claims, 2 Drawing Sheets

NONWOVEN SURFACE FINISHING ARTICLES REINFORCED WITH A POLYMER BACKING LAYER AND METHOD OF MAKING SAME

This is a continuation of application Ser. No. 08/457,108 filed Jun. 1, 1995 now abandoned, which is a divisional application of 08/279,065 filed Jul. 22, 1994 now U.S. Pat. No. 5,482,756.

BACKGROUND OF THE INVENTION

1. Field of the Invention

This invention relates to nonwoven surface finishing articles comprising a three-dimensional web and a reinforcing backing formed of a polymer layer. The invention also relates to a method of making the articles involving coating the web with a layer of polymeric material.

2. Prior Art

Nonwoven three-dimensional fibrous abrasive products have been employed to remove corrosion, surface defects, burrs, and impart desirable surface finishes on various articles of aluminum, brass, copper, steel, wood, and the like. Nonwoven, lofty, three-dimensional, fibrous abrasive products made according to the teaching of U.S. Pat. No. 2,958,593 have been in wide use for quite some time. These abrasive products are used in the form of discs and belts, but have the drawback of easily snagging on sharp edges when in the form of endless belts. The belts also do not have sufficient breaking strength for many applications.

Various references teach reinforcing such nonwoven, lofty, three-dimensional abrasive products. U.S. Pat. No. 3,324,609 describes an attempt to reinforce the nonwoven fibrous web by needle tacking the three-dimensional web into a support web. U.S. Pat. No. 3,688,453 discloses another method of reinforcing three-dimensional fibrous webs by needle tacking the web-forming fibers into a reinforcing scrim and then impregnating the resultant structure with a binder containing abrasives. The scrim reinforced nonwoven abrasive products have been widely used but were not stretch resistant for many applications when in the form of a belt. U.S. Pat. No. 4,331,453 discloses delamination resistant abrasive belts and discs comprising a lofty, nonwoven, three-dimensional abrasive web adhesively laminated to a stretch resistant woven fabric with adhesive polyurethane binders. U.S. Pat. No. 4,609,581 discloses a coated abrasive sheet structure wherein a fibrous surface of the backing is coated with a hot melt adhesive to both lock fibers into a support backing and to prepare a smoothed surface for subsequent overcoating with a liquid adhesive and abrasive particles. Although these products were stretch resistant, there still existed a need for a snag resistant, flexible product.

Lofty, fibrous abrasive belts have been developed which are improvements of the articles described in U.S. Pat. Nos. 4,331,453 and 3,688,453. Preferably these three-dimensional, lofty, fibrous abrasive articles are stretch resistant, smooth running, durable and snag resistant. Improved products were made by substitution of a woven cloth for an open mesh cloth employed in U.S. Pat. No. 3,688,453. These improved, stretch resistant, nonwoven abrasive belts were snag resistant and performed well in uses where the belt was supported by a contact wheel against the article being finished. However, in those applications where the belt is supported by a stationary platen, excessive friction between the fibers protruding through the woven cloth and the platen caused excessive abrasion and heating of the platen. As a result, this belt operated in a jerky fashion which produced an inconsistent surface finish on the article being finished and caused excessive wear of the platen. There exists a need for an abrasive article without fibers protruding from the backside of the article.

In spite of the aforementioned patents, there exists a need for a durable, snag resistant, stretch resistant, low friction, fiber-free back, fibrous abrasive or polishing product.

SUMMARY OF THE INVENTION

The invention provides lofty, low density, fibrous, nonwoven articles suitable for abrasive and polishing belts, pads, discs, etc. The articles of the invention comprise:

a) a nonwoven three-dimensional layer comprising an open, lofty web of crimped synthetic fibers which are adhesively bonded substantially at points of mutual contact with a binder material; and b) a reinforcing polymeric layer fused to one major surface of said abrasive layer with fibers from the nonwoven layer extending into and terminating in the polymeric layer.

The polymeric layer encapsulates the fibrous backside of the lofty nonwoven abrasive product in addition to providing a smooth, flexible, low friction surface which has substantially no fibers protruding therefrom. The polymeric layer also strengthens the three-dimensional, nonwoven product.

DETAILED DESCRIPTION OF THE PREFERRED EMBODIMENT

There are different forms in which the abrasive or polishing article of the present invention may be utilized. The figures show both a belt and a disc, but other forms are envisioned. Generally, the present invention utilizes an abrasive or polishing layer securely fixed to a reinforcing polymeric backing or support in the form of a belt or disc. The term reinforcing is broadly meant to illustrate a flexible support structure. Abrasive and polishing belts in the past tended to stretch after use rendering the belts unable to be properly held on the belt drive of surface finishing equipment. Other limitations included inflexibility, snagging of the woven backing, inadequate backing strength, and excessive friction at a platen surface. The use of a polymeric backing solves these problems and provides further benefits in the abrasives and polishing fields.

Figure 1:
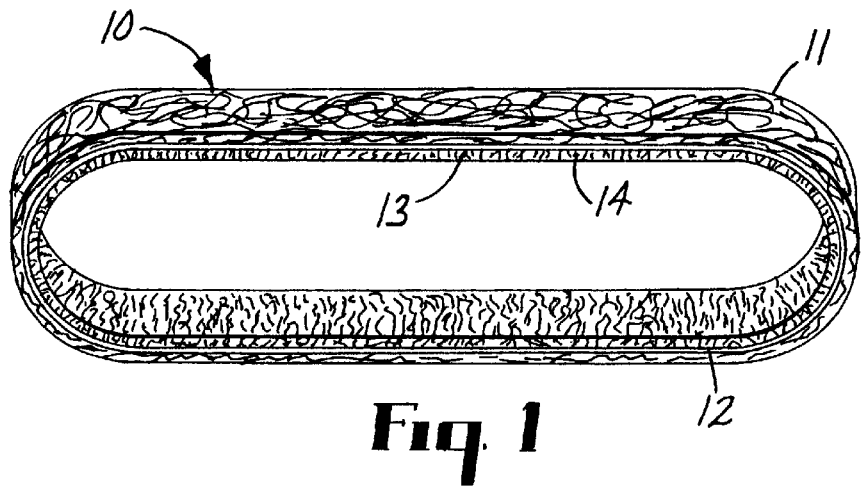
FIG. 1 is a perspective view of an abrasive belt of the present invention.
Figure 3:
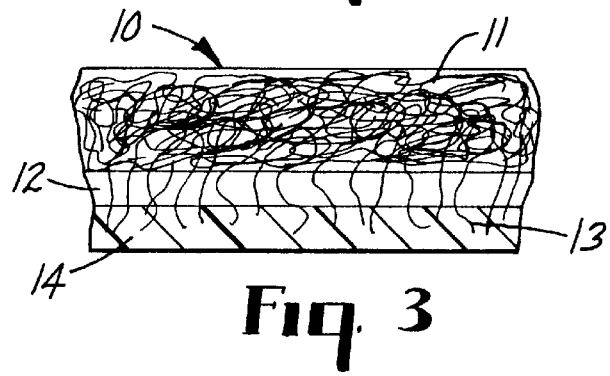
FIG. 3 is an enlarged side elevation view of a segment of the abrasive belt of the present invention with a reinforcing fabric.
Figure 4:
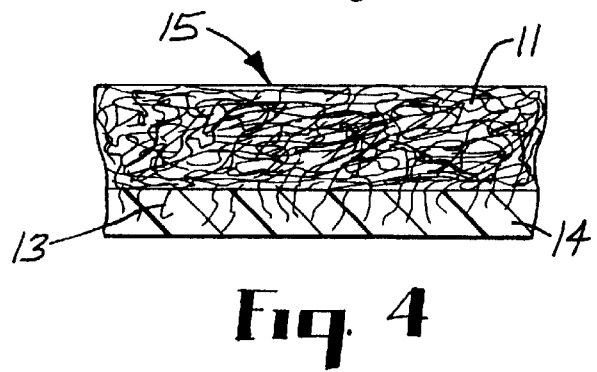
FIG. 4 is an enlarged side elevation view of a segment of the abrasive belt of the present invention with the reinforcing fabric omitted.

Referring to FIG. 1, a belt 10 of the present invention is shown. A three-dimensional fibrous layer 11 and optional woven stretch resistant cloth 12 are shown as a composite structure with some of the fibers of fibrous layer 11 extending through cloth 12 to provide a second fibrous layer 13 on the opposite side of cloth 12. Polymeric layer 14 is visible as encapsulating fibrous layer 13. Referring to FIG. 3, there is shown a segment of an abrasive or polishing article 10 as a composite of a three-dimensional fibrous layer 11, an optional woven stretch resistant cloth 12, through which protrudes a fibrous layer 13, and a layer of solidified polymer 14, which encapsulates fibrous layer 13. Referring to FIG. 4, there is shown an alternative article 15 which comprises a three-dimensional fibrous abrasive or polishing layer 11, and solidified polymer layer 14 which encapsulates and partially impregnates the fibers adjacent one surface of three-dimensional fibrous layer 11.

Figure 6:
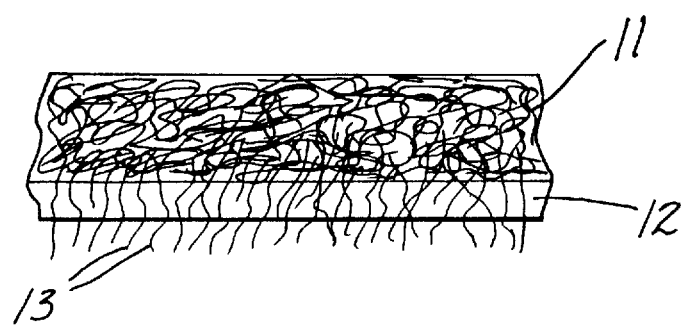
FIG. 6 is an enlarged side elevation view of a segment of an abrasive belt of the prior art.

FIG. 6 shows a segment of an article according to the prior art which includes a three-dimensional fibrous layer 11, reinforcing fabric 12 through which fibers of the fibrous layer 11 are projected to provide fibrous layer 13 on the opposite side of cloth 12 without a polymeric layer to obscure their presence on this surface.

Figure 2:
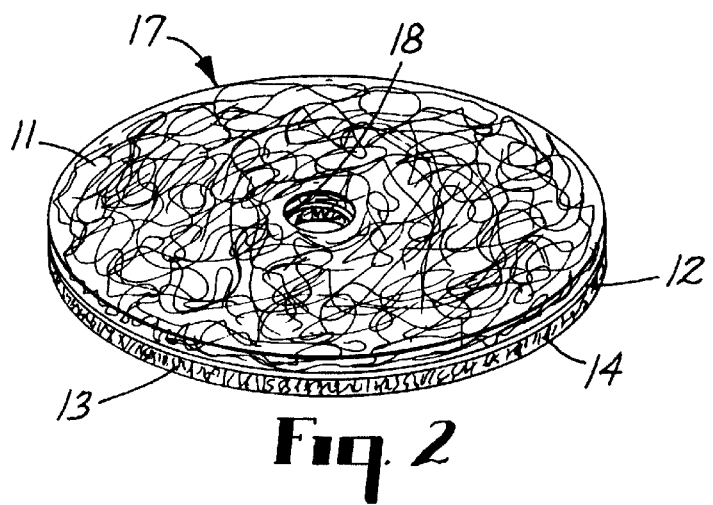
FIG. 2 is a perspective view of an abrasive disc in accordance with the invention.

The articles of the invention may be in the form of an endless belt or in the form of a disc 17 (as depicted in FIG. 2) which may have a central opening 18 to facilitate mounting.

The lofty, open, low-density, fibrous, nonwoven web portion of the three-dimensional layer 11 of article 10 may be of any synthetic fiber such as nylon, polyester, etc. capable of withstanding the temperatures at which the impregnating resins and abrasive binders are cured without deterioration. The fibers are preferably tensilized and crimped. Fibers found satisfactory for the nonwoven portion are about 20 to about 100 mm, preferably about 40 to about 65 mm in length and have a denier of about 1.5 to about 500, preferably 15 to 100. If desired, fibers of mixed denier may be used to obtain a desired surface finish. Also, use of larger fibers permits the employment of larger abrasive particles. The nonwoven web is readily formed on a "Rando Webber" machine (commercially available from Curlator Corporation) or may be formed by other conventional carding processes. The fibrous portion of the article preferably comprises at least about 100, most preferably about 250 g/m$^2$. Lesser amount of fiber provides belts having a somewhat lower commercial work life. These fiber weights typically provide a web, before needling or impregnation, of a thickness of about 6 to about 75 mm, preferably about 25 mm.

The nonwoven web 11 is secured to the woven cloth by means of needle tacking. Needle tacking is a method of attaching nonwoven webs to a woven cloth. A barbed needle passes through the nonwoven web and penetrates the woven cloth, the barbed needle pulling along fibers of the nonwoven web. The needle thereafter is retracted, leaving individual or collections of fibers of the web attached to the woven cloth. The amount or degree of needle tacking found necessary to provide useful abrasive articles has been found to be at least about 8, preferably about 20 needle penetrations per cm$^2$ of web surface when 15×18×25×3.5 RB 6-32-5.5/B/3B/2E needles (commercially available from the Foster Needle Company are used. The needle tacking is readily accomplished by the use of a conventional needle loom which is commercially available from the James Hunter Machine Company.

Following needle tacking, the article is impregnated either with a resin-abrasive slurry (if an abrasive article is desired) or a resin binder using a 2-roll coater to thoroughly saturate the nonwoven and woven cloth fibers. The dried resin aids in securing the nonwoven fibers to the woven cloth backing. Preferred resins are those which are relatively hard and which provide firm bonding of the nonwoven fibers to each other and the woven cloth backing. Resins found satisfactory include phenol-formaldehyde, epoxy, polyurethane, urea-formaldehyde, and other resins which are commonly utilized in making nonwoven, low density abrasives. The top surface is coated with resin-abrasive slurry by spray coating or other coating means. For abrasive mineral coated belts satisfactory for use in article finishing, it has been found that the nonwoven surface should have a Shore A durometer of about 25 to 85 as measured with a 5 mm diameter instrument foot. A lower durometer measurement results in a belt easily snagged and torn by sharp corners of the articles being finished. Articles of higher durometer measurements are excessively dense, load up with pieces of abradant, perform like sand paper, and do not provide the excellent uniform finish expected by nonwoven abrasives.

The optional abrasive particles generally utilized are of 24 grade and finer such as those normally used for a finishing operation and comprise aluminum oxide, silicon carbide, talc, cerium oxide, garnet, flint, emery, etc. If desired, commonly used metal working lubricants such as greases, oils, stearates, and the like may be incorporated into the three-dimensional layer of the belts or discs of the invention.

The article may also be used for polishing workpieces. If the article is to be used for polishing, a resin-abrasive slurry is not applied to the nonwoven surface.

The woven supporting backing, when employed, is a stretch resistant fabric having a low stretch value when pulled in opposite directions. The stretch value is less than about 5%, preferably less than about 2.5%, when subjected to $175\times10^2$ Newtons stress per lineal meter width. Preferred materials to provide the woven backing of the abrasive product are conventional woven cloth backing materials utilized in coated abrasive products. Such woven backing materials include woven nylon, polyester or cotton cloth exemplified by drills, jeans or greige cloth fabric with polyester greige cloth being preferred. Such fabrics are typically treated with a sizing agent, such treatment being preferred to produce the abrasive product of the present invention. The fabric should be selected so that it is compatible with solvents, binders and process conditions utilized in the preparation of the abrasive or polishing product of the present invention.

The polymeric layer which impregnates and encapsulates the fibrous back side of the nonwoven web is a fluid composition that flows around the fibrous back side and hardens in a controlled manner to form a reinforcing, thick, continuous layer which encapsulates one outer surface of the web without significant penetration throughout the balance of the nonwoven abrasive web. The resultant composite, a product of this invention, has increased stiffness and durability with enhanced utility when compared with similar nonwoven, low density, three-dimensional abrasive or polishing products. The polymeric layer can be polymerized in situ from liquid reactive components, or a polymeric material that can be sufficiently fluidized by melt extrusion, can form a coatable, hardenable composition to encapsulate the fibrous web. The term "hardenable" is meant to denote any form of hardening a polymer to a solid material at room temperature. Hardening in situ occurs by curing a reactive system after coating the system on the nonwoven or woven material. (Curing can be accomplished by UV, peroxides or any other known curing methods.) Hardening after melt extrusion occurs when the polymer solidifies at room temperature. Generally, when the nonwoven, low density, three-dimensional web contains a reinforcing mesh or woven cloth, a portion of the fibers penetrate through the mesh or woven cloth. The polymeric layer should be sufficiently thick to intimately contact the cloth and encapsulate the fibers protruding through the cloth such that the fibers terminate in the polymeric layer to produce a smooth, "fiber protruding free" surface opposite the nonwoven face of the belt, pad or disc. By the terms "fiber protruding free" and "terminating in the polymeric layer", it is meant substantially all of the fibers extending from the web terminate in the polymeric layer and do not extend out of the surface of the polymer layer opposite that to which the web is adhered.

For satisfactory performance, the hardness of the continuous polymer layer should be from about Shore 50 A to a Shore 80 D with a preferred range of about Shore 90 A to Shore 70 D. Materials softer than about Shore 90 A may have excessive friction and cause heat buildup in some use applications which may result in thermal degradation of the polymer layer. When the polymer is harder than about Shore 70 D the composite may be too stiff for applications such as belts. In some abrasive disc applications, however, it may be desirable to have the composite of this invention be somewhat less flexible.

The thickness of the continuous polymer layer is typically between 175 and 1750 micrometers, more preferably between about 250 to 1000 micrometers. Polymer layers having a thickness significantly less than about 250 micrometers have insufficient integrity and durability. If the polymeric layer is thicker than about 1000 micrometers, the resultant composite may be undesirably stiff for some applications, but this of course is somewhat dependent upon selection of polymer composition, some being softer and more pliable than others. There are some applications which might require such a stiff backing and thus the selection of the polymer depends on the end use. When employing harder, stiffer polymers, the composite becomes excessively stiff for many applications if the polymeric layer is thicker than about 1750 micrometers.

The composite, nonwoven product of the invention, when used in the form of endless belts, pads or discs, should have some flexibility to be useful and provide an adequate economic life. Further, in abrasive or polishing belt applications, the polymer layer should be resistant to heat buildup under use conditions, e.g., when the moving belt is supported by a stationary platen. Prior belts which had fibers protruding out the side opposite the abrasive surface in contact with the platen commonly suffered from excessive heat buildup. As the workpiece is pressed against such a prior art belt, the protruding fibers pressed against the platen and created heat with belt movement. The friction-generated heat is both a safety hazard and shortens the life of the belt or disc.

The continuous polymeric layer can be formed from polymerization of liquid reactants. Useful reactive polymer systems include thermal or radiation cured urethane and epoxy resins. One such liquid reactive system is the two-part laminate adhesive composition described in Example 1 of U.S. Pat. No. 4,331,453. The continuous polymer layer is preferably a thermally (melt) extruded polymer. Thermoplastics such as nylons, polyesters, polypropylene, polyethylene/vinyl acetate copolymers, acrylic/butadiene/styrene copolymers and the like, and thermoplastic elastomers such as ionomers, polyesters, polyurethanes, polyamide ethers, and the like are examples of suitable melt extrudable polymers. The polymeric layer may also contain compatible fillers, pigments, short reinforcing fibers, antioxidants, lubricants, etc.

Suitable melt extrudable polymers have been found to have a melt flow temperature greater than about 115° C. as measured by Differential Scanning Calorimetry (DSC), described in ASTM E 537-86. At melt flow temperatures less than about 115° C. the melt extrudable polymer in a composite belt may prematurely fail in many applications when forced at higher pressures against a platen. This is due to the frictional heat buildup occurring between the backside of the belt and the platen. Melt extrudable polymers having a melt flow temperature greater than about 150° C. are preferred, particularly where the abrasive belt is used at higher workpiece pressures.

Figure 5:
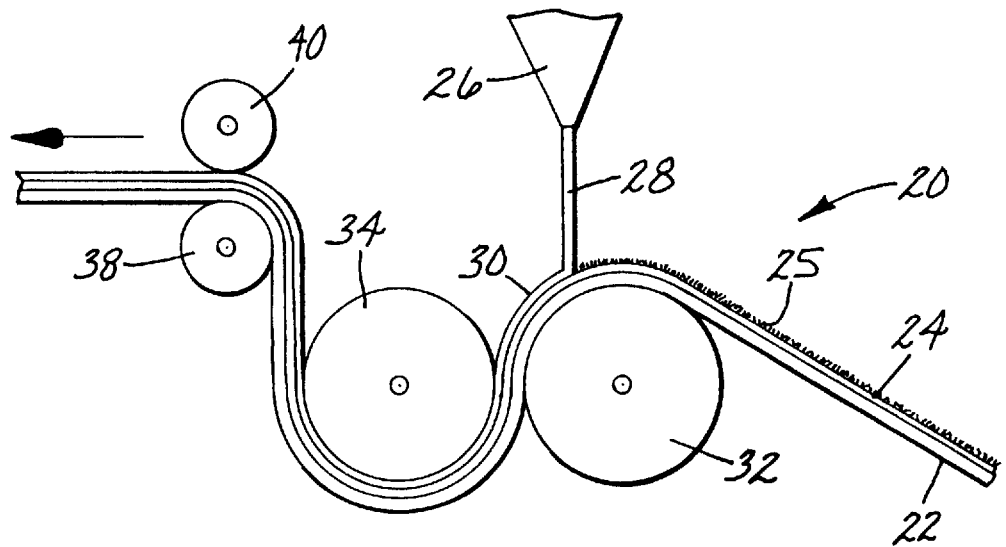
FIG. 5 is a schematic diagram depicting a method of manufacturing an embodiment of the article of the invention.

FIG. 5 illustrates the preferred method of manufacture of the article of the invention. A laminate 20 comprising a lofty nonwoven web 22 secured to a woven cloth 24 is fed into a coating process with fibers 25 protruding through cloth 24. (In the preferred method the nonwoven web 22 is previously needled to the woven cloth 24, a liquid binder is applied to the nonwoven web, and the binder is allowed to cure.) The laminate is fed under extruder 26 having a die opening capable of forming a sheet 28 of molten polymer. Sheet 28 is directed onto the woven cloth 24 side of laminate 20 to engulf protruding fibers 25 to form polymer layer 30. Counter rotating rollers 32 and 34 are spaced to apply a force on opposed surfaces of the laminate to smooth the surface of polymer layer 30. Rotating roller 34 is chilled such that polymer layer 30 solidifies after contacting roller 34. Nip rolls 38 and 40 guide the resultant coated laminate to a storage roll (not shown) or to a cutting station (not shown) where the coated laminate may be cut to size and shape.

EXAMPLES

The following examples, in which all parts are by weight unless otherwise indicated, illustrate various embodiments of lofty, open, low density abrasive articles of the invention. The examples are exemplary only and are not intended to be limiting.

CONTROL EXAMPLE A

This control example describes the preparation of a nonwoven abrasive composite comprising a polyester greige sateen, heat set, destretched woven cloth which weighs 260 g/m$^2$ and is available from Milliken, Inc. to which is needled a lofty, open nonwoven air laid web of. 50 mm long 60 denier per filament oriented nylon 66 filaments having 5.5 crimps per 25 mm which were opened and formed into a web weighing 280 g/m$^2$ using a Rando Webber machine. (commercially available from the Curlator Corporation). The nonwoven air laid web was placed upon the greige polyester cloth and needled into and partially through the greige cloth using about 20 needle penetrations per cm$^2$ of web surface when 15×18×25×3.5 RB 6-32-5.5/B/3B/2 E needles are used. The resultant composite had about 75 percent of the thickness above the center line of woven cloth and about 25 percent below the center line. The needled composite was roll coated with the following polyurethane resin solution:

| Ingredients | Parts |
| --- | --- |
| Ketoxime-blocked poly(1,4-oxybutylene)glycol tolylene diisocyanate having a molecular weight of about 1500 (sold under the trade designation "Adiprene" BL-16) | 66.2 |
| Mixture of 35 parts p,p'-methylene dianiline (sufficient to provide 1 NH$_2$ group for each NCO group) and 65 parts ethylene | 22.9 |

-continued

| Ingredients | Parts |
|---|---|
| glycol monoethyl ether acetate sold under the trade designation Cellosolve acetate solvent | |
| Red pigment dispersion (contains about 10% pigments, about 20% Adiprene BL-16 and 70% ethylene glycol monoethyl ether acetate solvent) | 10.9 |
| Ethylene glycol monoethyl ether acetate solvent (solution viscosity was adjusted to 1,200–1,400 cps. by addition of glycol monoethyl ether acetate) | as required | cured, and followed by a spray coating with an abrasive particulate/phenol-formaldehyde resin slurry:

| Ingredients | Parts |
|---|---|
| 2-ethoxyethanol solvent (available under the trade designation "Ethyl Cellosolve") | 8.4 |
| A-stage base-catalyzed phenol-formaldehyde resin having a phenol-formaldehyde mole ratio of 1:1.9 (70% solids) | 21.0 |
| A 100% solids amine terminated polyamide resin having a viscosity of about 700 cps, an acid number of about 3 and an amine value of about 320 grams of resin per amine equivalent (commercially available from the Celanese Coating Co. under the trade designation "Epi-Cure 852") | 4.8 |
| Fused alumina abrasive grains grade 100-150 (available under the trade designation "Alundum") | 59.4 |
| Red dye (13% solids in "Ethyl Cellosolve") | 1.5 |
| Petroleum oil (632–712 S.S.U. seconds at 38° C. and 70–74 S.S.U. seconds at 99° C.) | 3.9 |
| Bentonite | 1.0 |

After heating at 160° C. for 10 to 15 minutes in an air impingement oven, the resultant composite weighed about 1925 g/m² and wa approximately 9 mm thick.

EXAMPLE 1

The nonwoven composite described above in Control Example A was coated on its backside (that having 25% of the fibers protruding from its surface) with a molten layer of nylon 6,10 (commercially available from E. I. dupont) (melt flow temperature 220° C.) which flowed over and around the fibers protruding through the backside of the needled greige polyester cloth web laminate. The molten coating was applied from a slot extrusion die having the same width as the nonwoven composite. The nonwoven composite was immediately passed between two counter rotating steel rolls, rotating at the same surface speed as the nonwoven composite, the abrasive side partially wrapped over a 150 mm diameter first roll, at ambient temperature. The second steel roll, 760 mm diameter, was chilled with water to about 15 ° C. The extruded nylon 6,10 molten film was produced by a single screw extruder fitted with a slot die heated at 230° C. The slot die has a 350–450 micrometer gap. The molten film, dropping about 100 mm from the slot die, contacted the backside of the nonwoven composite just ahead of the nip between the steel rolls. As the nonwoven composite and the molten nylon polymer passed between the rolls, the molten polymer was forced around the fibers on the backside of the nonwoven composite and the polymer surface was smoothed by the second chilled roll. Flow rate of the molten nylon from the slot die and speed of the nonwoven composite were essentially the same, about 0.15 m/s, to produce an article of the invention. The nylon 6,10 coating weighed about 265 g/m² and was about 300 micrometers thick. The coating was fairly smooth to the touch. The resultant composite weighed 2100 g/m², was about 10 mm thick and was moderately stiff.

The composite nonwoven abrasive of this example was then slit into 50 mm widths and fabricated into 865 mm long endless belts suitable for use on conventional coated abrasive belt sanders. In preparation for making a butt splice, the ends of the 50 mm wide strip were cut at an angle of approximately 30° from the perpendicular to the length of the belt, and both ends were scuffed on the backside to remove the melt coated nylon polymer as well as the fibers which protruded through the greige cloth. A butt belt splice was then made using a conventional polyurethane splicing adhesive and a heated belt splicing press. The 50 by 865 mm nonwoven abrasive composite belt of Example 1 was evaluated in comparison to Control Example A. The belt was mounted on a portable, air-powered, hand-held platen sander (Model Dynangle II 14050, manufactured by Dynabrade Co.) which had a 150 mm long platen that supported the belt when the belt was urged against a workpiece. The belt, operating at a speed of 20.3 m/s was urged against a 15 mm thick steel plate edge, having a 6 mm radius edge, with a controlled force of about 67 Newtons for 3 minutes.

It was observed the belt of Example 1 did not show any deterioration of the backside of the belt, the platen became only slightly warm, and the belt ran smoothly in contact with the platen.

Using the same test procedure, the belt of Control Example A produced a high heat buildup at the platen, showed significant deterioration of the fibrous protrusions, did not run smoothly against the platen causing grabbing and jerking, and when urged for long periods, wear of the platen surface was observed.

EXAMPLE 2

The nonwoven composite of Control Example A was coated, by a method described below, with a molten layer of polyester commercially available under the trade designation of "Hytrel" 4056, a Shore 40 D durometer thermoplastic elastomer having a melt flow temperature of 158° C., and available from the E.I. duPont Company. The melt extrusion slot die was maintained at 250° C. The coating was dropped from about 50 mm above the product onto the backside of the product of Control Example A at a point about 25 mm ahead of the nip formed by two 100 mm diameter steel rolls. The coated web then proceeded downwardly between the nip rolls rotating at a speed of 0.025 m/s, into a water cooling bath (10° C. ) wherein the water nearly covered the bottom half of the rolls. The nip rolls were positioned to force the molten polymer around the fibers protruding through the greige cloth yielding a smooth surface. The composite was partially wrapped around the roll, contacting the melt extruded coating, and thereafter exited the water cooling bath. The melt polymer weighed 1075 g/m² and was about 950 micrometers thick. The nonwoven composite of this example was very flexible. When the composite nonwoven abrasive of this example was fabricated in 50 by 865 mm belts and evaluated on the hand held platen sander according to the procedure given in Example 1, it showed low heat buildup, was smooth running, and no deterioration of the back side of the belt.

EXAMPLE 3

The nonwoven abrasive composite of this example was prepared in the same way as Example 2 except that a Shore 82 D durometer thermoplastic polyester elastomer having a melt flow temperature of 223° C., commercially available under the trade designation "Hytrel" 8256, available from E.I. duPont Company was used in place of the "Hytrel" 4056 polymer. The extrusion die was maintained at 300° C. The melt applied coating weighed about 625 g/m² and was about 1000 micrometers thick. The resultant structure was somewhat stiffer than Example 2. This product performed satisfactorily on the hand-held platen sander test described in Example 1 with nominal heat generated and good flexibility.

EXAMPLE 4

The nonwoven abrasive composite of this example was prepared in the same way as Example 2 except that a Shore 48 D durometer thermoplastic polyurethane elastomer, having a melt flow temperature of 115° C., commercially available under the trade designation "Estane" 58409, available from the B. F. Goodrich Company, was used in place of the "Hytrel" 4056 polymer. The extrusion die was maintained at 210° C. to apply a 1000 micrometer thick layer weighing 1125 g/m². The resultant nonwoven composite was moderately flexible and a belt made from this composite was evaluated on the platen sander test described in Example 1. There was moderate heat buildup and signs of slight deterioration were visible on the back side of the belt but overall the belt performed satisfactorily and was an improvement over prior art belts.

EXAMPLE 5

The nonwoven abrasive composite of this example was prepared in the same way as Example 2 except that polypropylene, having a melt flow temperature of 170° C., and commercially available under the trade designation "Escorene" 3014, available from the Exxon Chemical Company, was used in place of "Hytrel" 4056 polymer. The extrusion die was maintained at 210° C. with a 1000 micrometer layer being applied resulting in a final coating weighing 940 g/m². The resultant nonwoven composite was moderately stiff, but can be used successfully for applications requiring stiffer belts.

EXAMPLE 6

The nonwoven abrasive composite of this example was prepared in the same way as Example 2 except that Grade B860 polyethylene, having a melt flow temperature of 114° C. and commercially available under the trade designation "Grade" B860 from the Chevron Corporation was used in place of the "Hytrel" 4056 polymer. The extrusion die was maintained at 150° C. with a 1000 micrometer layer weighing 1075 g/m² being applied. The resultant nonwoven composite was more flexible than the composite of Example 5. A belt made from this composite showed some deleterious flow of the polyethylene layer when evaluated on the hand held platen sander but could be used in applications which do not require heavy forces against the platen.

EXAMPLE 7

A nonwoven, low density abrasive product prepared as disclosed in Example 1 of U.S. Pat. No. 4,331,453, incorporated herein by reference, with the exception of the lamination step. The nonwoven abrasive backing was a fibrous nonwoven structure that did not contain a woven cloth as a reinforcement and this material weighed about 775 g/m² and was about 9 mm thick. The resultant composite structure was about 10 mm thick, weighed about 880 g/m² and the melt applied layer was about 380 micrometers thick. A disc was cut from the composite and a drive button as described in assignee's U.S. Pat. No. 3,562,968 was adhered to the melt polymer backing. When used with the holder of U.S. Pat. No. 3,562,968 the nonwoven composite was a useful surface treating tool and the polymeric layer protected the holder when the nonwoven layer wore thin.

EXAMPLE 8

The nonwoven abrasive composite of this example was prepared in the same way as Example 2 except that plasticized polyvinyl chloride thermoplastic mixture having a melt flow temperature of 101° C. and containing about 35% diisononyl phthalate plasticizer, about 59% medium molecular weight polyvinyl chloride, and about 6% stabilizers was used in place of the "Hytrel" 4056 polymer. The extrusion die was maintained at 190° C. and a 1000 micrometer thick layer weighing about 1350 g/m² was coated to the backside of the cloth. The resultant nonwoven composite, when evaluated as described in Example 1, did not perform as well as the Example 1 belt due to deleterious flow of the polymer layer but did not heat up the platen as Control Example A did. A belt made from this composite could be used in applications which do not require heavy forces against the platen.

In view of the foregoing description, it will be apparent that the invention is not limited to the specific details set forth herein for purposes of illustration, and that various other modifications are equivalent for the stated and illustrated functions without departing from the spirit of the invention in the scope thereof as defined in the appended claims.

What is claimed is:

1. A method of manufacturing a surface treating article useful as a rotatable disc or an endless belt comprising the steps of:
    (a) providing a non-woven, three-dimensional layer comprising an open, lofty web of crimped synthetic fibers adhesively bonded substantially at points of mutual contact with a binder material containing a plurality of abrasive particles, the non-woven layer having a Shore A durometer ranging from about 25 to 85;
    (b) applying a hardenable, coatable composition over one major surface of the nonwoven sheet; and
    (c) hardening the composition to form a continuous reinforcing polymeric layer having a thickness of about 175 to 1750 micrometers attached to and encapsulating one major surface of the nonwoven layer, the fibers from the nonwoven layer extending into and terminating in the polymeric layer to provide a surface which has substantially no fibers protruding therefrom, the polymeric providing greater resistance to heat build up than the one major surface of the nonwoven layer during abrasive and polishing applications.

2. The method of claim 1 wherein the applying is by melt extrusion of the coatable composition and hardening is by permitting the coatable composition to solidify on cooling.

3. The method of claim 1 wherein the coatable composition is a polymeric material with a melt flow temperature greater than 115° C.

4. The method of claim 3 (wherein the coatable composition comprises a material selected from the group consisting of nylon, polyester, polypropylene, polyethylene/vinyl acetate copolymer acrylic/butadiene/styrene copolymer, polyester, polyurethane, and polyamide ether.

5. The method of claim 1 further comprising cutting and splicing the article into a continuous belt.

6. A method of manufacturing a surface treating article useful as a rotatable disc or an endless belt, comprising the steps of
   (a) providing a nonwoven, three-dimensional abrasive layer comprising an open, lofty web of crimped synthetic fibers;
   (b) positioning a woven fabric such that there is mutual contact between a first face of said fabric and said nonwoven material;
   (c) needling the nonwoven material through the fabric;
   (d) adhesively bonding the synthetic fibers at points of mutual contact with a binder material containing a plurality of abrasive particles the non-woven layer having a Shore A durometer ranging from about 25 to 85;
   (e) applying a hardenable, coatable composition over a second face of the woven fabric; and
   (f) hardening the composition to form a continuous reinforcing polymeric layer having a thickness of about 175 to 1750 micrometers attached to and encapsulating one major surface of the nonwoven layer, the fibers from the nonwoven extending through the woven fabric and terminating in the polymeric layer to provide a surface which has substantially no fibers protruding therefrom the polymeric layer providing greater resistance to heat build up than the second face of the woven fabric during abrasive and polishing applications.

7. The method of claim 6 wherein the applying is by melt extrusion of the coatable composition and hardening is by permitting the coatable composition to solidify on cooling.

8. The method of claim 6 wherein the coatable composition is a polymeric material with a melt flow temperature greater than 115° C.

9. The method of claim 6 wherein the coatable composition comprises a material selected from the group consisting of nylon, polyester, polypropylene, polyethylene/vinyl acetate copolymer, acrylic/butadiene/styrene copolymer, polyester, polyurethane, and polyamide ether.

10. The method of claim 6 further comprising cutting and splicing the article into a continuous belt.

* * * * *

UNITED STATES PATENT AND TRADEMARK OFFICE
CERTIFICATE OF CORRECTION

PATENT NO.: 5,858,140

DATED: January 12, 1999

INVENTOR(S): Jeffrey L. Berger and Gary M. Fariss

It is certified that error appears in the above-identified patent and that said Letters Patent is hereby corrected as shown below:

| | |
|---|---|
| Col. 7, line 45 | "E. I. dupont" should read --E. I. duPont-- |
| Col. 10, line 52 | after "polymeric" insert --layer-- |
| Col. 10, line 61 | "claim 3" should read --claim 1-- |
| Col. 10, line 64 | after "acetate copolymer" insert --,-- |
| Col. 12, line 1 | after "nonwoven" insert --layer-- |
| Col. 12, line 3 | after "therefrom" insert --,-- |

Signed and Sealed this

Thirty-first Day of August, 1999

Attest:

Attesting Officer

Q. TODD DICKINSON

Acting Commissioner of Patents and Trademarks